United States Patent [19]
Batey, Jr. et al.

[11] Patent Number: 6,104,512
[45] Date of Patent: Aug. 15, 2000

[54] METHOD FOR ADJUSTING THE POWER LEVEL OF AN INFRARED SIGNAL

[75] Inventors: Charles E. Batey, Jr.; Carlos M. Rodriguez; John B. Van Zile, all of Lake Worth, Fla.

[73] Assignee: Motorola, Inc., Schaumburg, Ill.

[21] Appl. No.: 09/012,444

[22] Filed: Jan. 23, 1998

[51] Int. Cl.$^7$ .................................................. H04B 10/00
[52] U.S. Cl. .................... 359/152; 359/172; 340/825.72; 455/38.3; 455/522
[58] Field of Search ..................................... 359/143, 110, 359/152–153, 157, 171–172; 455/38.3, 69, 522; 340/825.72

[56] References Cited

U.S. PATENT DOCUMENTS

| | | | |
|---|---|---|---|
| 4,516,221 | 5/1985 | Nakata | 364/900 |
| 4,580,262 | 4/1986 | Naylor et al. | 371/5 |
| 4,649,385 | 3/1987 | Aires et al. | 379/57 |
| 4,727,600 | 2/1988 | Avakian | 455/601 |
| 4,777,653 | 10/1988 | Bonnerot et al. | 455/69 |
| 4,804,955 | 2/1989 | Yoshizawa | 340/825.44 |
| 4,825,193 | 4/1989 | Siwiak et al. | 340/311.1 |
| 4,825,200 | 4/1989 | Evans et al. | 341/23 |
| 4,939,731 | 7/1990 | Reed et al. | 371/32 |
| 4,991,184 | 2/1991 | Hashimoto | 375/8 |
| 5,036,515 | 7/1991 | Freeburg | 371/5.5 |
| 5,075,792 | 12/1991 | Brown et al. | 359/152 |
| 5,087,982 | 2/1992 | Smothers | 359/137 |
| 5,128,942 | 7/1992 | Kojima | 371/5.5 |
| 5,128,965 | 7/1992 | Henriksson | 375/58 |
| 5,218,466 | 6/1993 | Brooks | 359/152 |
| 5,220,678 | 6/1993 | Feei | 455/69 |
| 5,247,380 | 9/1993 | Lee et al. | 359/118 |
| 5,343,319 | 8/1994 | Moore | 370/95.1 |
| 5,440,559 | 8/1995 | Gaskill | 359/95.1 |
| 5,546,411 | 8/1996 | Leitch et al. | 371/5.5 |
| 5,566,022 | 10/1996 | Segev | 359/172 |
| 5,623,355 | 4/1997 | Olsen | 359/110 |

FOREIGN PATENT DOCUMENTS

| | | |
|---|---|---|
| 63-59229 | 3/1988 | Japan . |
| 5-153055 | 6/1993 | Japan . |

OTHER PUBLICATIONS

PageWriter™ 2000 User's Manual by Motorola, Inc., Document No. 6880496G51–O, 1997.
Williams, Millar, *The IrDA Platform*, Networks and Communications Laboratory, HP Laboratories Bristol, HPL–95–29, Mar. 1994, Hewlett Packard © 1995.
*Infrared IrDA® Complaint Transceiver*, Preliminary Technical Data pp. 57–62, HSDL–1001, Hewlett Packard.
*IrDA® Data Link Design Guide*, Appendix and pp. 1–82, Hewlett Packard 1995.
Motorola MC68328 (DragonBall)™ Integrated Processor User's Manual, pp. 8–1 thru 8–13, 1995.

*Primary Examiner*—Kinfe-Michael Negash

[57] ABSTRACT

An electronic device (50) includes an infrared transceiver (510) having adjustable infrared signal intensity capability. The electronic device (50) commences to establish communications with a secondary device (420 and/or 430) at a first power level, if the communication link is not established, the electronic device (50) increases the IR power level and tries again to establish communications. In an alternate embodiment, the electronic device (50) includes a power level table which keeps the power level which has been established for each secondary device (420, 430) using the method described above. The electronic device (50) before communicating with each of the secondary devices determines the proper power level to use depending on the secondary device (420, 430) it wants to communicate with. In still a further embodiment, instead of determining the power level to use at the start of the communications, an ongoing exchange of signal quality information is sent between the communicating devices in order to adjust the power level of the devices during the communication session.

30 Claims, 11 Drawing Sheets

METHOD FOR ADJUSTING THE POWER LEVEL OF AN INFRARED SIGNAL

FIELD OF THE INVENTION

This invention relates in general to electronic devices, and more specifically to a method for adjusting the power level of an infrared signal.

BACKGROUND OF THE INVENTION

Some electronic devices use built-in infrared (IR) circuitry in order to allow them to communicate with other devices either on a unidirectional or bi-directional basis. For example, some calculators have built-in infrared circuits which allow them to communicate with printers. While some computer keyboards use built-in infrared links to communicate with their respective computer system.

Infrared links are cost effective solutions and are especially suited for portable electronic devices given that they are fairly simply to implement, do not take up much room on the electronic device's main printed circuit board (PCB) and are fairly inexpensive to design-in.

Infrared communication links however present several drawbacks over other types of communication links, such as RS-232 serial links, etc. One drawback to IR communications is that if the two devices which are communicating with each other are placed in very close physical proximity to each other, IR distortion due to increased bit error rate may affect the communications if the IR transmitter(s) are operating at high IR power (intensity) levels. This problem typically comes about because the IR transceivers in the electronic devices may be set at a certain power level in order to guarantee IR communications at up to a certain distance (e.g., one meter) from the other device. In order to meet the distance specification, the IR transceivers are set with IR transmit power levels which will guarantee communications at the given distance (e.g., one meter, etc.), while still providing a high level of noise immunity in a typical use (e.g., office) environment. One standard setting body which sets such specifications for the industry is "The Infrared Data Association" (IrDA), which has been set up to establish standards for infrared communications. In order to be compliant with some of the IrDA standard(s), a IR transmitter must typically operate at a high enough power level to guarantee communications up to a certain distance (e.g., one meter) away from another device.

Another problem typically encountered using IR communications is found when the IR transmitters (or transceivers) are designed into portable radio frequency (RF) communication devices such as two-way pagers, personal digital assistance (PDAs) having radio communications capabilities, etc. The problem in this environment is that the embedded IR circuitry can sometimes generate noise which may affect the radio frequency transmissions of the device in question. The noise generation of the IR circuitry is sometimes worse at higher IR transmissions levels since the electronic device's power supply is more heavily loaded at the higher IR transmit power levels.

A final problem typically found with the use of IR circuitry in portable electronic devices is that in situations were the IR transmissions are set at high power levels, the IR transceiver operation will increase the battery charge times for the portable electronic devices when the electronic device is being charged, if IR communications are taking place during the charging of the electronic device. Higher IR levels for portable electronic devices also mean reduced battery life for the portable devices.

DESCRIPTION OF THE PREFERRED EMBODIMENT

Figure 1:
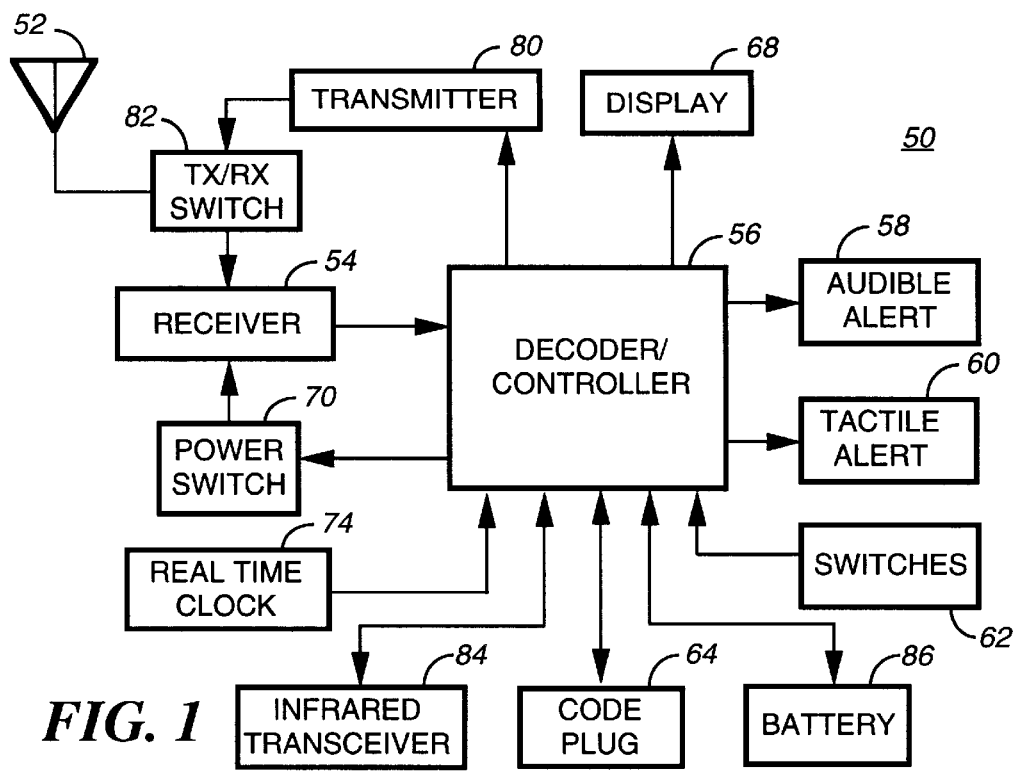
FIG. 1 is a block diagram of an electronic device in accordance with the preferred embodiment of the present invention.

Referring now to the drawings and in particular to FIG. 1, an electrical block diagram of a first electronic device such as a selective call transceiver (e.g., a two-way pager, etc.) in accordance with the preferred embodiment of the present invention is shown. The selective call transceiver (communication device) 50 comprises an antenna 52 for intercepting transmitted RF signals which are coupled to the input of a receiver section 54. The RF signals are preferably selective call (paging) message signals which provide a receiver address and an associated message, such as numeric or alphanumeric message. However, it will be appreciated that other well known paging signaling formats, such as tone only signaling or tone and voice signaling, would be suitable for use as well. The receiver 54 processes the RF signal and produces at the output a data stream representative of a demodulated address and message information. The demodulated address and message information are coupled into the input of a decoder/controller 56 which processes the information in a manner well known in the art. A power switch 70, coupled to the decoder/controller 56, is used to control the supply of power to the receiver 54, thereby providing a battery saving function as is well known in the art for use with selective call receivers.

For purposes of this illustration, it will be assumed that the FLEX™ (FLEX™ a trademark of Motorola, Inc.) protocol for two-way paging which is well known in the art is used, although other signaling formats (e.g., POCSAG, etc.) could be utilized as well. When the address is received by the decoder/controller 56, the received address information is compared with one or more addresses stored in a code plug (or code memory) 64, and when a match is detected, the message is stored in memory. Optionally, an alert signal is generated to alert a user that a selective call message, or page, has been received. The alert signal is directed to an audible alerting device 58 for generating an audible alert or to a tactile alerting device 60 for generating a silent vibrating alert. Switches 62 allow the user of the selective call receiver to select between the audible alert 58 and the tactile alert 60 in a manner well known in the art.

The message information which is subsequently received is stored in memory (not shown) and can be accessed by the user for display using one or more of the switches 62 which provide such additional functions as reset, read, delete, etc. Specifically, by the use of appropriate functions provided by the switches 62, the stored message is recovered from memory and processed by the decoder/controller 56 for displaying by a display 68 which enables the user to view the message. A real time clock circuit 74 provides conventional timing features such as the information required to display time of day information on display 68. A paging transmitter 80 under the control of controller 56 transmits messages and user requests. A conventional antenna switch 82 selectively couples the transmitter 80 or receiver 54 to antenna 52.

A battery 86 provides power to the two-way pager 50. Preferably, battery 86 is a rechargeable battery variety such as those made using nickel-metal hydride cells, etc. Pager 50 also includes an internal infrared transceiver 84 for communicating with external devices. The internal infrared transceiver 84 will be discussed in more detail further below. Although in the preferred embodiment an infrared transceiver 84 is used, it can be appreciated that if the pager 50 does not need to have bi-directional communication with the external devices, an infrared transmitter circuit alone could be utilized in order to provide uni-directional IR transmissions as contemplated by some embodiments of the present invention.

Figure 2:
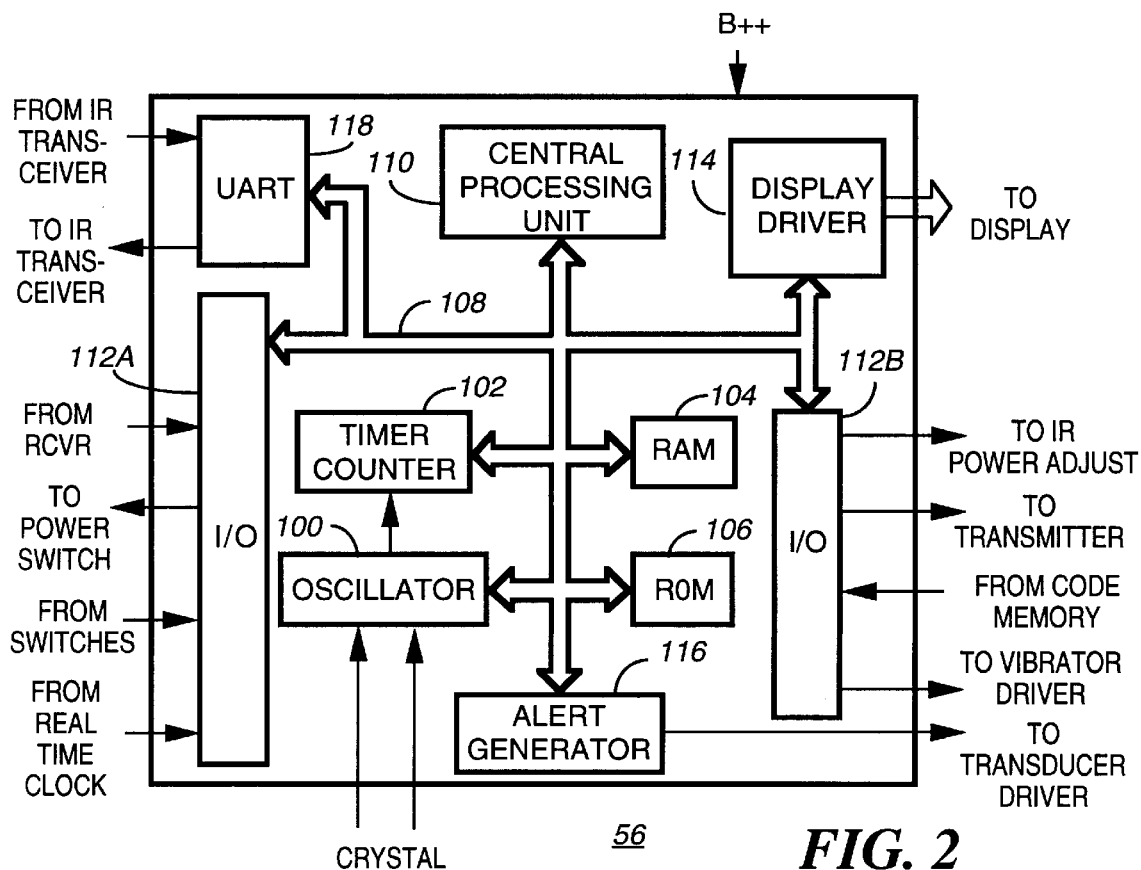
FIG. 2 shows a more detailed block diagram of the decoder/controller of FIG. 1 in accordance with the preferred embodiment of the invention.

The controller/decoder 56 of FIG. 1 can be constructed utilizing a microcomputer as shown in FIG. 2, although other hardware arrangements as known in the art can also be used. FIG. 2 is an electrical block diagram of a microcomputer based decoder/controller suitable for use in the selective call receiver of FIG. 1. As shown, the microcomputer 56 can preferably comprise a MC68HC05, a MC68HC11, or a MC68328 processor manufactured by Motorola, Inc., or other similar microcomputers or microprocessors which preferably include an on-board display driver 114. The microcomputer 56 includes an oscillator 100 which generates the timing signals utilized in the operation of the microcomputer 56. A crystal, or crystal oscillator (not shown) is coupled to the inputs of the oscillator 100 to provide a reference signal for establishing the microcomputer timing. A timer/counter 102 couples to the oscillator 100 and provides programmable timing functions which are utilized in controlling the operation of the receiver. A RAM (random access memory) 104 is utilized to store variables derived during processing, as well as to provide storage of message information which are received during operation as a selective call receiver as previously discussed. A ROM (read only memory) 106 stores the subroutines which control the operation of the receiver as well as the routines required to perform the present invention. Although the RAM 104 and ROM 106 have been shown internal to the controller 56, these memory types can also include external memory devices coupled to the controller 56.

It will be appreciated that in many microcomputer implementations, the programmable-ROM (PROM) memory area can be provided by, or further include, an EEPROM (electrically erasable programmable read only memory). The oscillator 100, timer/counter 102, RAM 104, and ROM 106 couple through an address/data/control bus 108 to a central processing unit (CPU) 110 which performs the instructions and controls the operations of the microcomputer 56.

The demodulated data generated by the receiver is coupled into the microcomputer 56 through an input/output (I/O) port 112A. The demodulated data is processed by the CPU 110, and when the received address information is the same as the code-plug memory which couples into the microcomputer through an I/O port 112B, the message, if any, is received and stored in RAM 104. Recovery of the stored message, and selection of the predetermined destination address, is provided by the switches which are coupled to the I/O port 112A.

In one embodiment of the invention, at the time a message is received, an alert signal is generated which can be routed through the data bus 108 to an alert tone generator 116 that generates the alert signal which is coupled to the audible alert device 58 that was described above. Alternatively, when the vibrator alert is selected as described above, the microcomputer generates an alert enable signal which is coupled through data bus 108 to the I/O port 112B to enable generation of a vibratory, or silent alert.

The battery saver operation of pager 50 is controlled by the CPU 110 with battery saving signals which are directed over the data bus 108 to the I/O port 112A which couples to the power switch. Power is periodically supplied to the receiver to enable decoding of the received selective call receiver address signals and any message information which is directed to the receiver. Infrared communications to and from the infrared transceiver circuit 84 are coupled to the controller 56 via universal asynchronous receiver/transceiver (UART) 118. Information from the real-time clock 74 are also coupled to the controller via I/O port 112A. Information to be transmitted via RF transmitter 80 are acted upon by the CPU 110 and sent via bus 108 to I/O port 112B. In accordance with the present invention CPU 110 provides the needed power adjustments signals to infrared transceiver 84 via I/O 112B as well be explained in more detail further below.

Figure 3:
FIG. 3 shows an electronic device in accordance with the preferred embodiment of the invention.

Referring now to FIG. 3, a top view of the two way pager 50 is shown. In the preferred embodiment the two way pager 50 comprises an electronic device such as a PAGEWRITER™ 2000 two-way pager modified to include the present invention. It is worth noting that the present invention can be used with any type of electronic device which requires, or could use, an IR circuit as will be explained below. Operational control of the device is controlled by a keypad which includes a plurality of user controls which allows a user to move within different fields (user selectable) or button locations which are displayed on display 68. The general operation (except for the present invention) of a two way pager 50 is discussed in detail in the PAGEWRITER™ 2000 User's manual which is hereby incorporated by reference. An IR port 302 found in the rear of pager 50 provides a port for IR transmissions to be sent and received by pager 50.

Figure 4:
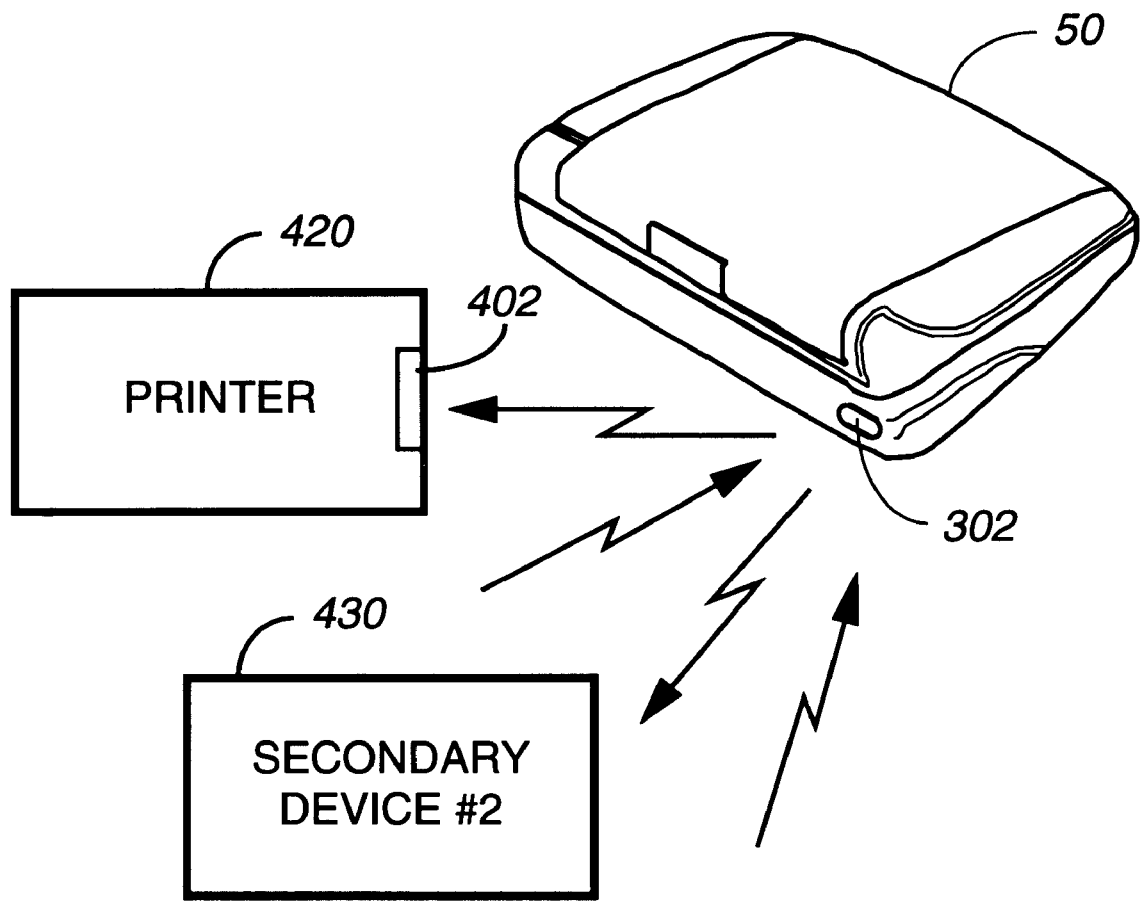
FIG. 4 shows a system in accordance with the invention which includes an electronic device and other devices which can communicate with each other using IR communications.

In FIG. 4, an IR system is shown which includes pager 50 and a second electronic device such as a printer (also referred to as the first secondary device) 420. Communications between pager 50 and printer 420 is accomplished via IR. Printer 420 includes an internal IR transceiver which communicates with the pager 50 via IR port 402. A second secondary device 430 (alternate second electronic device) which can also communicate with pager 50 is also shown in FIG. 4. Device 430 also includes a IR transceiver which allows it to have IR communications with pager 50.

Figure 5:
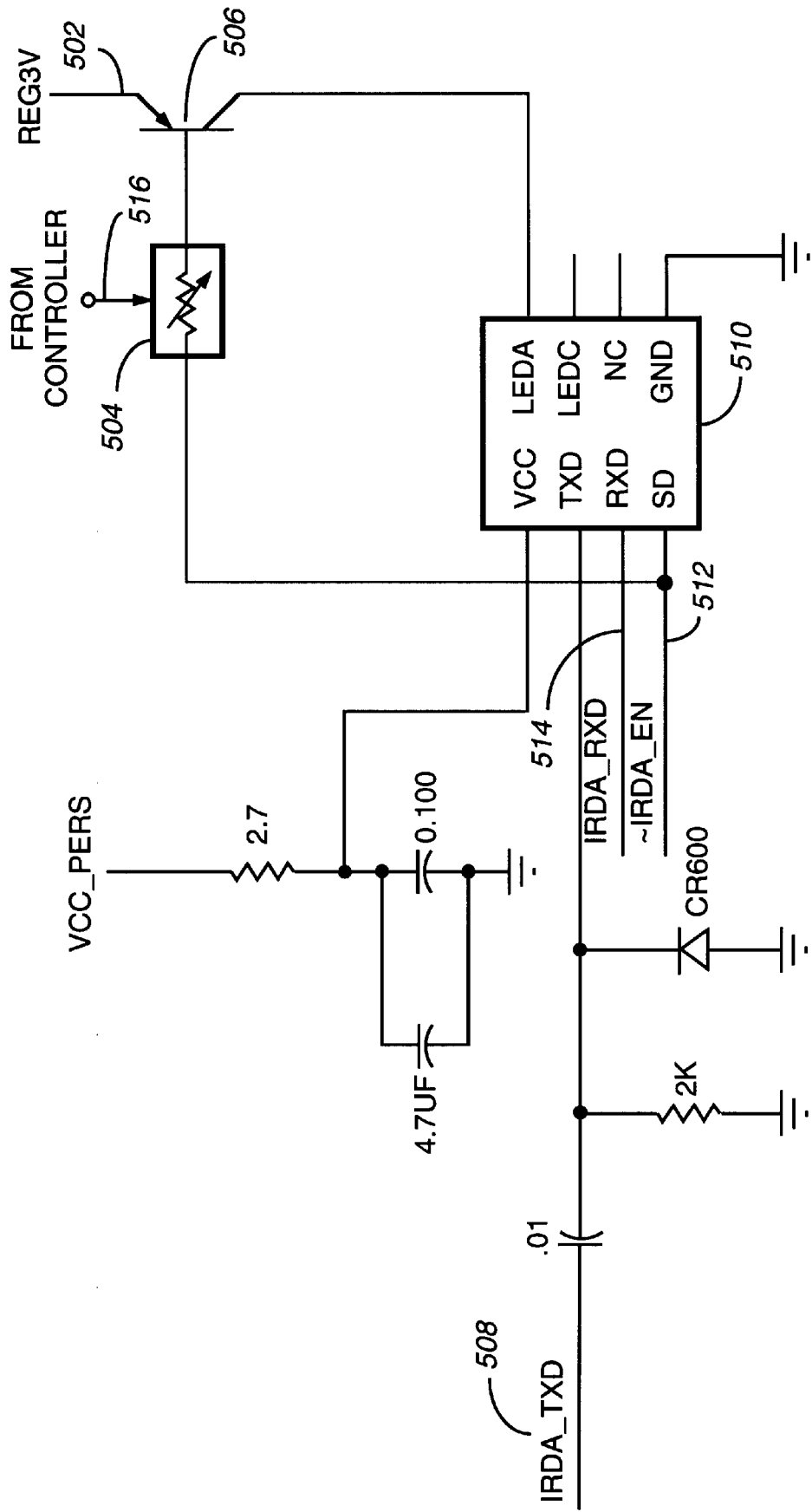
FIG. 5 shows a schematic of an adjustable IR transceiver circuit in accordance with the invention.

Referring now to FIG. 5, a detailed schematic of the IR circuit 84 located within the pager 50 is shown. The IR circuit 84 includes a conventional IR transceiver 510 such as an HSDL1001 IR transceiver manufactured by Hewlett-Packard, Inc. or other conventional IR transceivers manufactured by other manufacturers. IR transceiver 510 has a built-in IR receiver and transmitter. Data to be transmitted by pager 50 is sent via signal line 508 (labeled IRDA-TXD), the data to be transmitted is processed by controller 56 and sent to the IR transceiver 510 via the transmit signal line 508. A chip enable signal 512 (labeled IRDA_EN) is used to enable the IR transceiver 510.

IR signals received by the IR transceiver via IR port 302 are decoded by the IR transceiver 510 and sent to controller 56 via receive signal line 514 (labeled IRDA_RXD). In accordance with the present invention, the IR power level of the IR transmitter found in transceiver 510 is controlled by a control signal sent via line 516 from controller 56. In accordance with the preferred embodiment, the control signal adjusts a digital potentiometer 504 which controls the amount of base current in transistor 506. This in effect controls the amount of current allowed to flow to IR transceiver 510, thereby adjusting the power level (intensity) of the transmitted IR signals. In another embodiment, a fixed resistor could be used in the base of transistor 506 and the digital potentiometer could be placed between the REG3V voltage line 502 and the transistor's emitter terminal.

Figure 6:
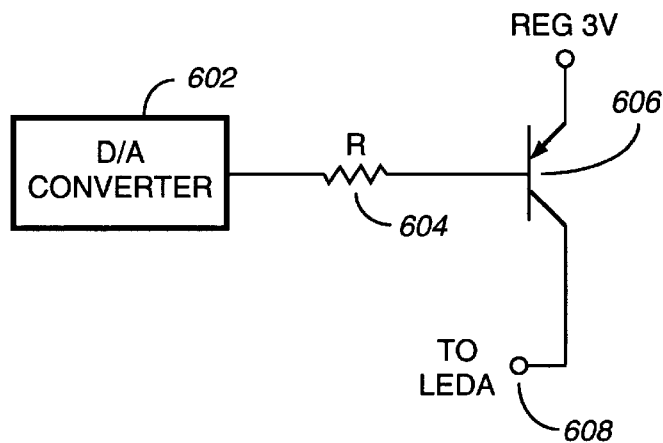
FIG. 6 shows an alternative adjustable current circuit which can be used with the IR transceiver shown in FIG. 5.

In FIG. 6, an alternate embodiment of the IR power adjustment circuit is shown, which can be used with the IR transceiver circuit shown in FIG. 5. In this power adjustment circuit, a digital to analog converter 602 under the control of controller 56 is used instead of a digital potentiometer. A fixed resistor 604 is located between the D/A converter 602 and the base terminal of transistor 606. The collector terminal 608 is coupled to the LEDA terminal of IR transceiver 510. It should be noted that there are many other circuit designs which can be implemented by those of ordinary skill in the art which would allow for the adjustment of the transmit IR power level of the IR transceiver 510 by controller 56 in order to implement the IR power adjustment methods of the present invention discussed below.

The IrDA family of protocol specifications require that the IR transceiver support a minimum transmission distance in order to be certified as "IrDA compliant". For example, to support a minimum transmit distance of 1 meter, the IR transmitter needs to be driven at a very high power level relative to what current pager power supplies can typically support. In accordance with the present invention, the power to the IR transceiver 510 is dynamically adjusted in order to minimize as much as possible the amount of current utilized by the electronic device in driving the IR transceiver 510. The present invention presents several methods of adjusting the power level of the IR transceiver 510. The invention encompasses two main types of dynamic power management for infrared communications between two or more electronic devices:

1. Session Based Power Management—In this type of power management, power can vary from communication session to communication session, but for a given session, the power level is fixed. The transmit power level for a given session is determined during the discovery phase of the communication session. The power level is adjusted by controller 56 providing the proper signal to the IR power adjustment circuit.

2. Packed Based Power Management—In this type of power management, the IR power can vary at any time during a particular communication session. The transmit power for a given packet of information is determined by signal quality information that is passed along with the packet acknowledgment.

Session Based Power Management

There are several different ways to implement session-based power management in accordance with the invention depending on the particular design constraints of the particular design at hand. In one application of session based power management, the application software controls the transmit power level of IR transceiver 510, while the conventional IrDA stack software controls the transmit enable line 512 for the IR transceiver 510. The idea in this application is to attempt a connection (communication link with another device) starting at a minimum power level. If the connection fails, the IR power level is incremented and the device retries to set-up a communication link.

Figure 7:
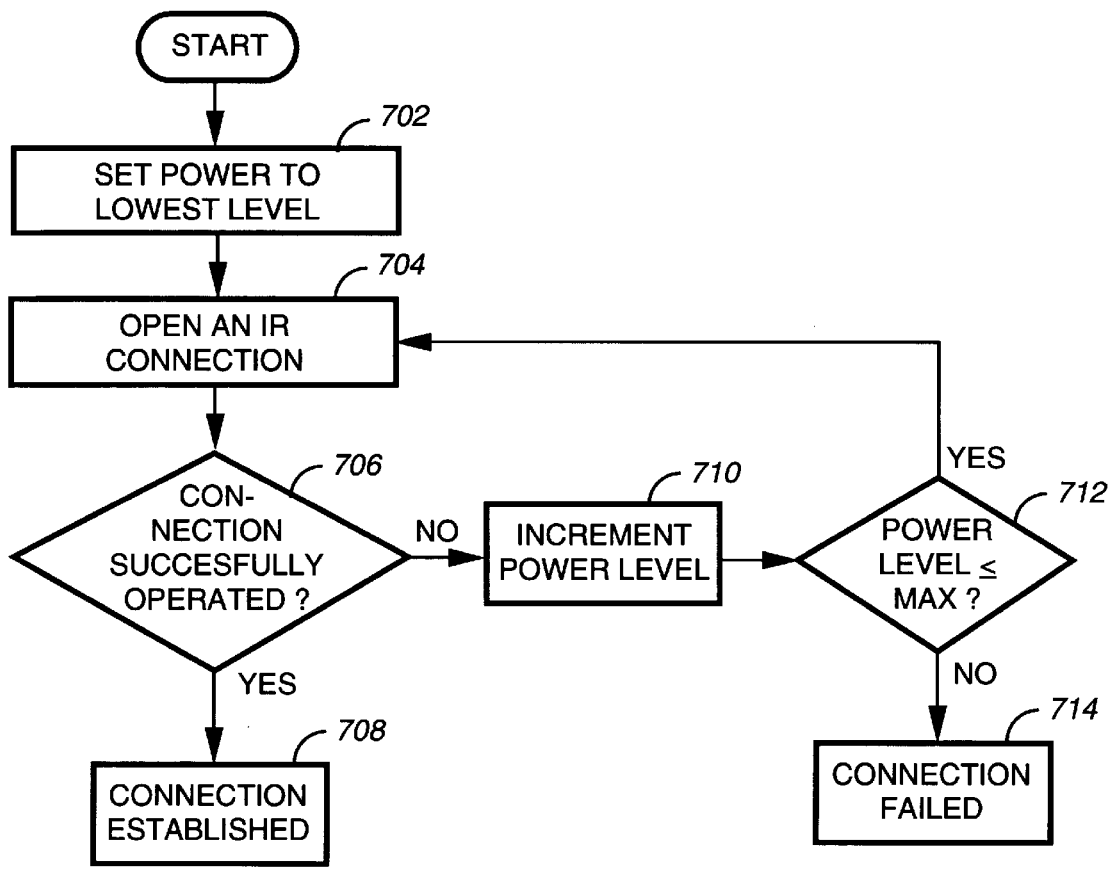
FIG. 7 is a flowchart highlighting the steps taken to adjust the IR power level in accordance with one embodiment of the present invention.

This method is highlighted in FIG. 7. In step 702, the IR power level is set at a first or lowest power level. In step 704, an IR connection between the pager 50 and another device (e.g., printer 420) is attempted. If in step 706, the connection is successful, in step 708, the communication link is established between the two devices at that power level. If however in step 706 the connection is not successful, in step 710 the IR power level is incremented to a second power level which is greater than the first power level. In step 712, it is determined if the current power level is set at a level less than or equal to a maximum power level which is predetermined and stored in the pager 50. If the current power level is found to be equal to or less than the maximum power level the routine attempts a new connection in step 704. If in step 712 it is determined that the current power level is greater than the maximum allowable power level, the connection is caused to fail in step 714. At which time an audible or visual indication can be given to the user of pager 50 to let him know of the connection failure.

The main advantages to this session based application is that it requires no modification to the existing IrDA stack of communication protocols which may already be residing in the device. This power adjustment method lets the electronic device establish an IR link at the lowest required transmit IR power level, thereby minimizing current drain and noise generation in device 50. The different power levels the pager 50 can chose from are preferably preprogrammed into the pager 50. The power level values adjust the IR power adjustment circuit (shown in FIGS. 5 and 6) to provide predefined IR output transmit intensity levels. These power level values are preferably stored in nonvolatile memory such as EEPROM, etc. These power levels values will cause an adjustment to either digital potentiometer 504 or D/A converter 602, which will in turn cause a transmit power adjustment to occur with IR transceiver 510.

Figure 8:
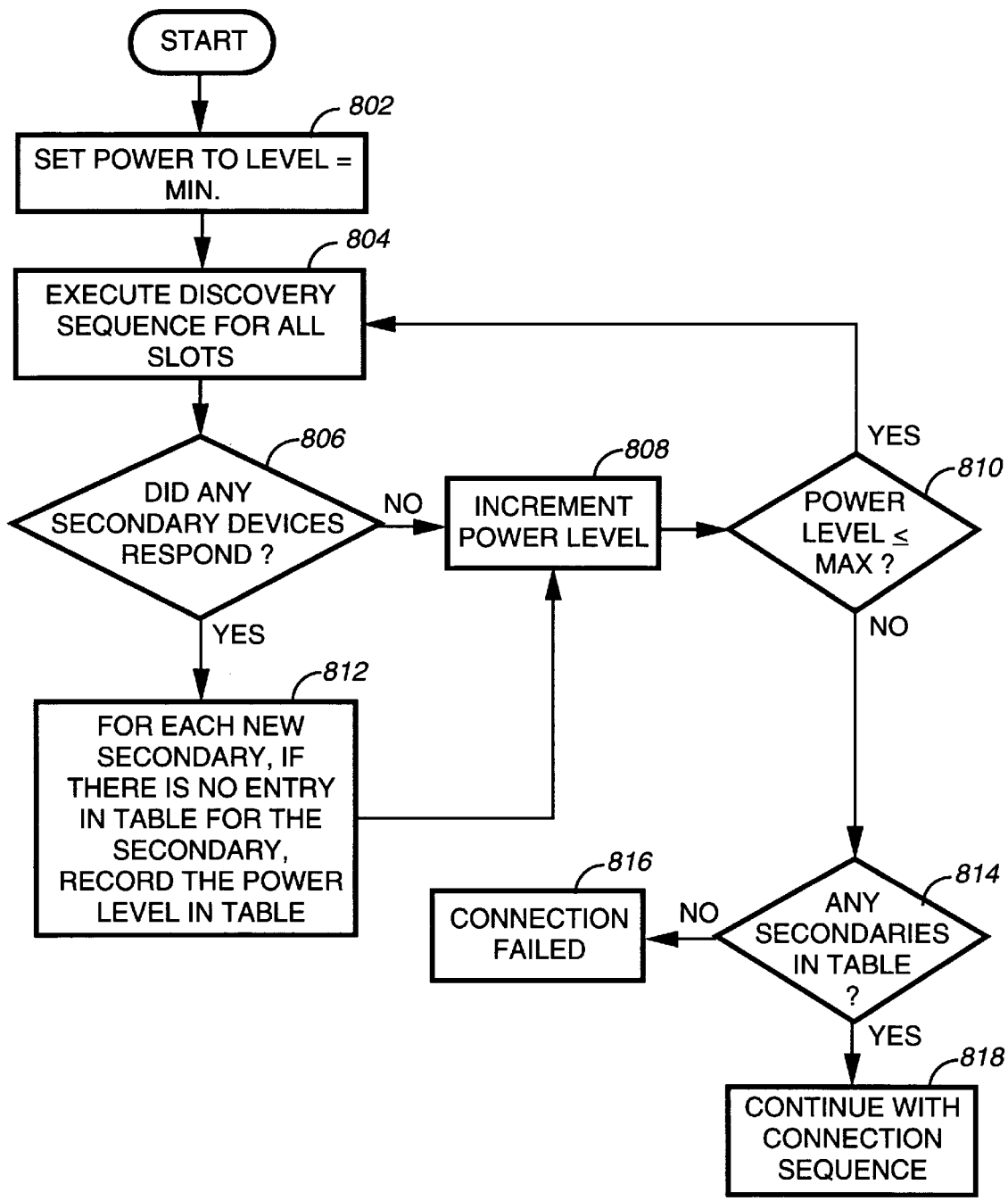
FIG. 8 is a flowchart highlighting the steps taken to adjust the IR power level in accordance with a second embodiment of the present invention.

A second application of session based power management is highlighted in FIG. 8. This method is similar to the method discussed above, however this method is implemented within the IrLAP portion of the IrDA stack, which hides the details of power management from the pager's application programs. For a better detail of IrLAP and other components of the IrDA stack of protocols, one is referred to an article entitled "The IrDA Platform", by Stuart K.

Williams and Iain Millar, dated Mar. 1994, and which is hereby incorporated by reference.

To open a connection, the IrLAP software on the primary device, pager 50, implements the algorithm described in FIG. 8. The main idea here is to execute the discovery process starting at a minimum transmit power level. If no secondary devices respond, the power level is incremented and a retry is performed. For each device that does respond, an entry is placed in a table stored in memory that indicates the power level used for that particular secondary device, along with the device's identification number. This ensures that the minimum power level required for each secondary device is used by the primary device. When the primary device, in this case pager 50, wants to communicate with any of the secondary devices which have responded, it first determines the power level to use for that particular secondary device by reading the power level table stored in RAM 104 associated with that particular device's identification number. Thus, when communicating with multiple secondary devices, the transmit power level can vary for each one. Pager 50 will have stored for each of the secondary devices an identification number which corresponds to that particular secondary device and the power level value to be used by pager 50 in memory.

In step 802, the power level is set to a predetermined minimum level. A discovery sequence is executed for each of the communication slots. Each slot in the communication protocol allows for communication with a different secondary device, so therefore this application allows for the primary device, pager 50, to communicate with multiple secondary devices (e.g., secondary devices 420 and 430), each at its own optimum power level.

In step 806, the device determines if any of the secondary devices responded to the discovery sequences of step 804. If any of the secondary devices responded, the power level used to achieve communications is stored in a power level table stored in the pager's memory as mentioned above. The power level table which is located in RAM 104 will include the identification number of the particular secondary device (s) and the power level used to achieve the communication link with that device(s).

In step 808, the IR transmit power level is incremented if no secondary devices have responded to the communication message transmitted by pager 50 at the minimum power level set in step 802. In step 810 it is determined if the current power level is above the preset maximum power level which is stored in nonvolatile memory. If the current power level has not surpassed the predetermined maximum power level which is stored in pager 50, the process returns to step 804. However, if the power level has surpassed the predetermined maximum power level, the routine moves on to step 814.

In step 814, the process determines if there is any information stored for any secondary devices in the power level table. If no information is stored for any secondary device in the power table, the connection process is determined to have failed in step 816. As part of step 816, the pager 50 can provide an audio and/or visual alert to the user indicating that a communication link was not able to be established with the one or more secondary devices 420 and/or 430.

If in step 806 one or more secondary devices responded to the communication message, the secondary device identification number and the power level used to achieve communications with the device are recorded and stored in the power level table. The routine will continue to loop through the steps and increment the IR power level until all of the secondary devices have established communication or the maximum predetermined power level threshold has been surpassed as determined in step 810.

Once the discovery phase of the communication link establishment has been completed, pager 50, will use the information in the power level table to adjust the IR transceiver's power level for each of the secondary devices the pager 50 is communicating with in step 818. As such, messages directed individually to each of the secondary devices will be transmitted at the lowest power level required to achieve communications with that particular secondary device. In the case that pager 50 wants to broadcast a message to all of the secondary devices at one time, pager 50 will use the highest power level stored in the power table for any of the stored secondary devices to guarantee that all of the secondary devices receive the broadcast message.

Figure 9:
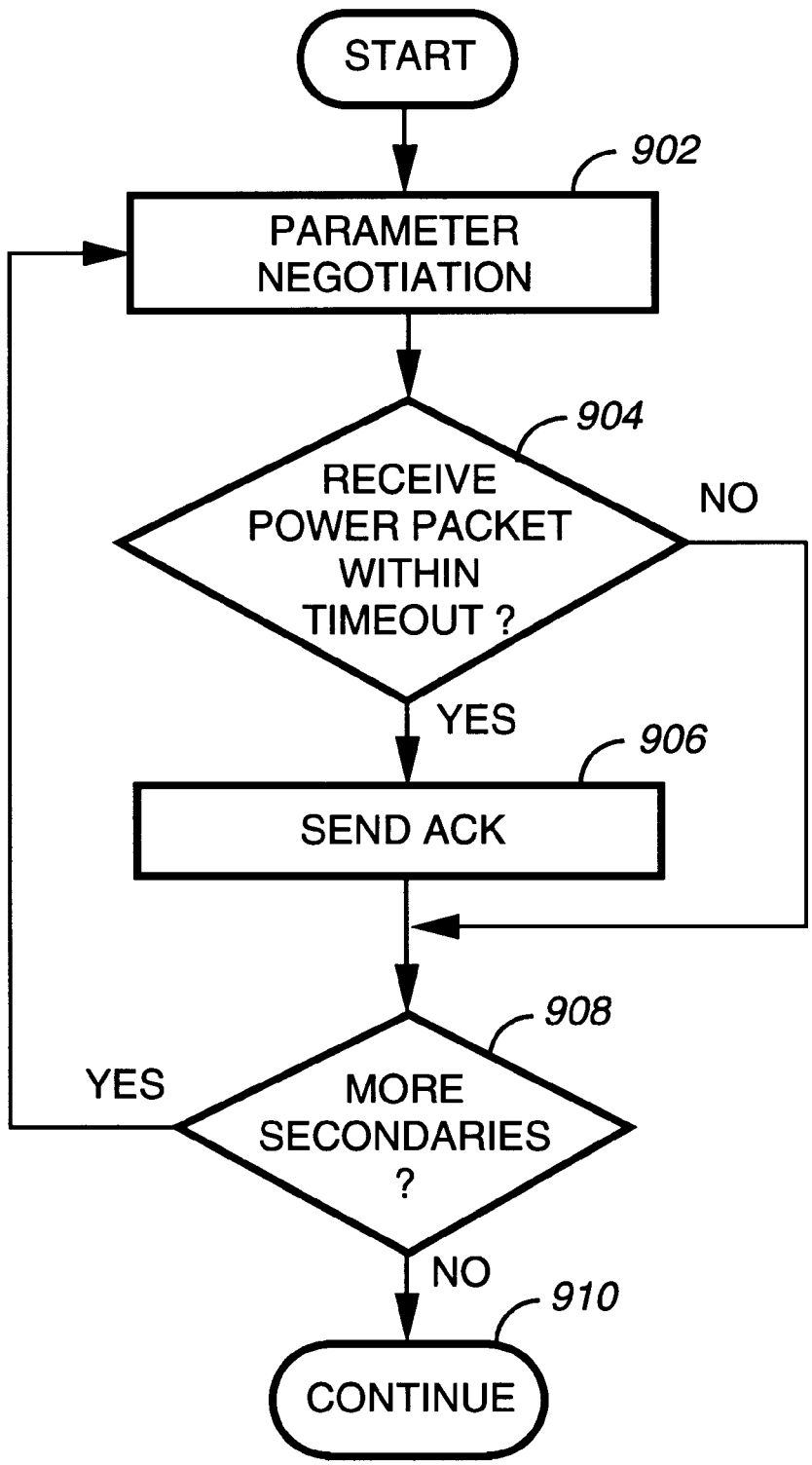
FIG. 9 is a flowchart highlighting the steps taken by a primary device to adjust the IR power level in accordance with a further embodiment of the present invention.
Figure 10:
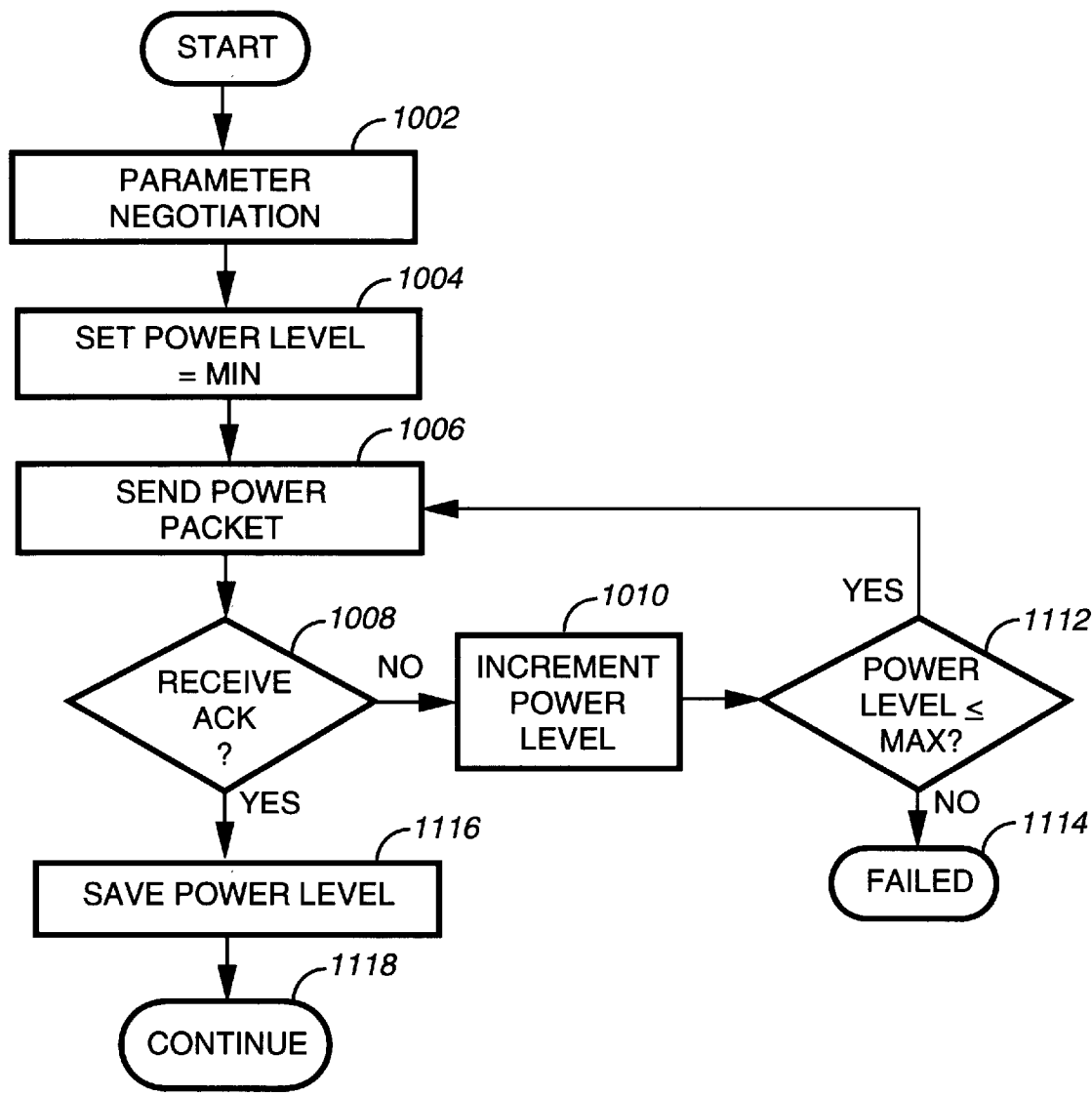
FIG. 10 is a flowchart highlighting the steps taken by a secondary device to adjust the IR power level in accordance with the embodiment of FIG. 9.

Referring now to FIGS. 9 and 10, a more sophisticated algorithm than that discussed in FIG. 8 is shown. This particular method builds on the method discussed with reference to FIG. 8 by adding an additional step which allows the secondary devices 420, 430 to optimize their transmit power levels as well. The primary device 50 is able to transmit to each secondary device at its optimum power level, and each secondary is able to transmit back to the primary at its optimum power level. This is done in a fashion that maintains compatibility with secondary devices that are not power-enhanced. This method provides a session-based power management scheme that supports both primary and secondary devices while maintaining backward compatibility.

To open a connection, the IrLAP software on the primary device 50 implements the algorithm described in the flow chart in FIG. 8 and as described above. Doing this establishes the primary device's transmit power levels for each secondary device it is connected to. The primary device than continues with parameter negotiation in step 902 for the first secondary device. At the conclusion of parameter negotiation, the secondary device is given the opportunity to perform its power management routine as described in the flowchart in FIG. 10. The routine for the primary device 50 is shown in FIG. 9, while the routine for the secondary device(s) is shown in FIG. 10.

If a secondary device 420, 430 is not power-enhanced, the primary device 50 will time-out in step 904, and continue with the next secondary device found in the power table repeating steps 902–906. If a power packet is received from the secondary within the predetermined time-out window, the primary sends an acknowledgment (ACK) message to the secondary device in step 906. The above steps are repeated for each of the secondary units stored in the power level table stored in pager 50. Once this is finished in step 910, the primary device continues with the communication session in step 910.

The secondary device 420 or 430 commences normal parameter negotiations in step 1002. The secondary device sets its transmit power level at a predetermined minimum IR transmit power level in step 1004. The secondary device than transmits a packet to the primary in step 1006.

If an acknowledgment message is received from the primary device in step 1008, the power level used (in this case the minimum power level) is stored in a power table stored in the secondary device's memory similar to that described above with reference to FIG. 8 for the primary device in step 1116. Normal communications is then resumed between the primary and secondary devices in step 1118.

If no acknowledgment is received within a predetermined period of time in step 1008, the secondary device increases its transmit power level in step 1010. It is then determined if the power level is less than or equal to a predetermined maximum level in step 1112. If the maximum power level has not been surpassed as determined in step 1112, the routine loops back to step 1006 using the next higher power level. If in step 1112 it is determined that the maximum power level has been surpassed, the connection fails in step 1114. An alarm can be provided at the secondary device indicating that the connection failed as part of step 1114.

Figure 11:
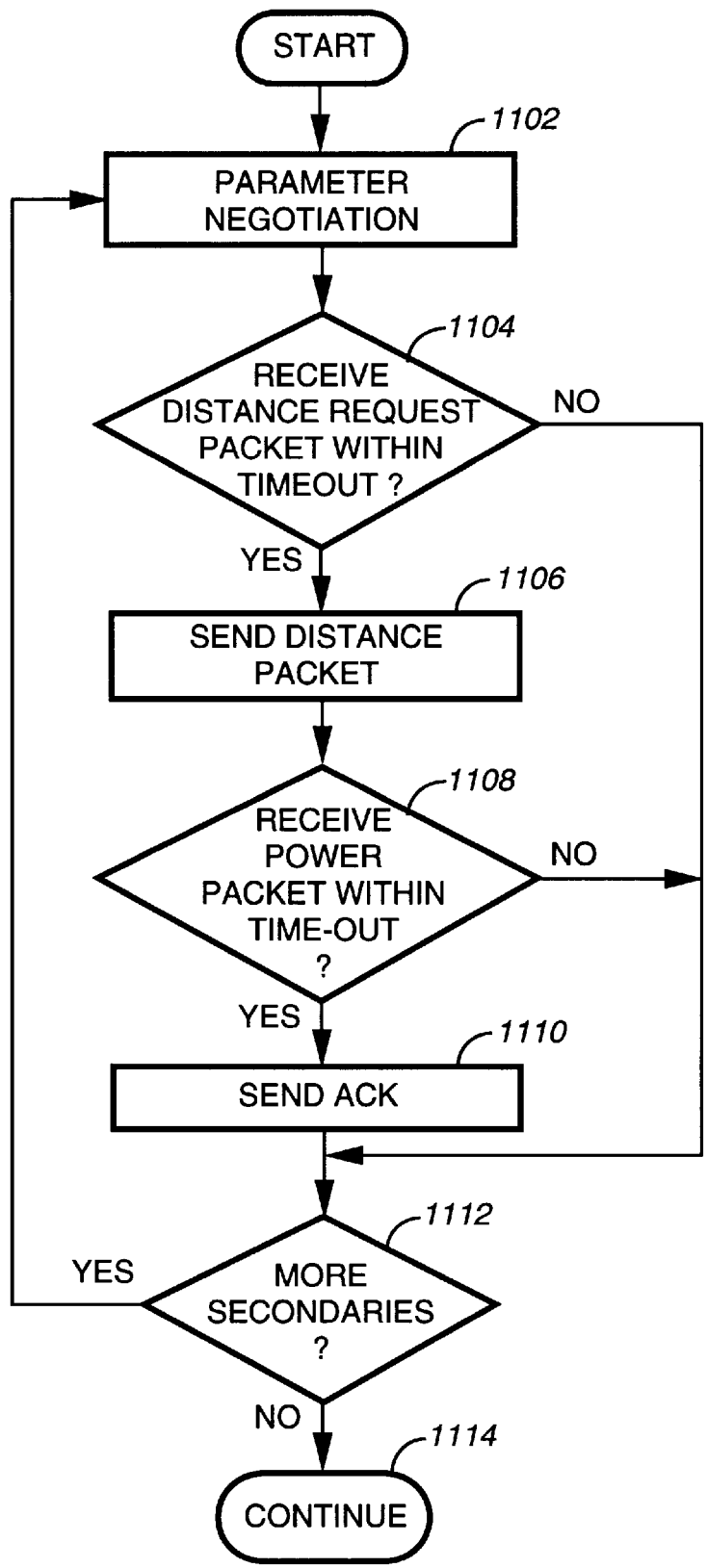
FIG. 11 is a flowchart highlighting the steps taken by a primary device to adjust the IR power level is accordance with a further embodiment of the present invention.
Figure 12:
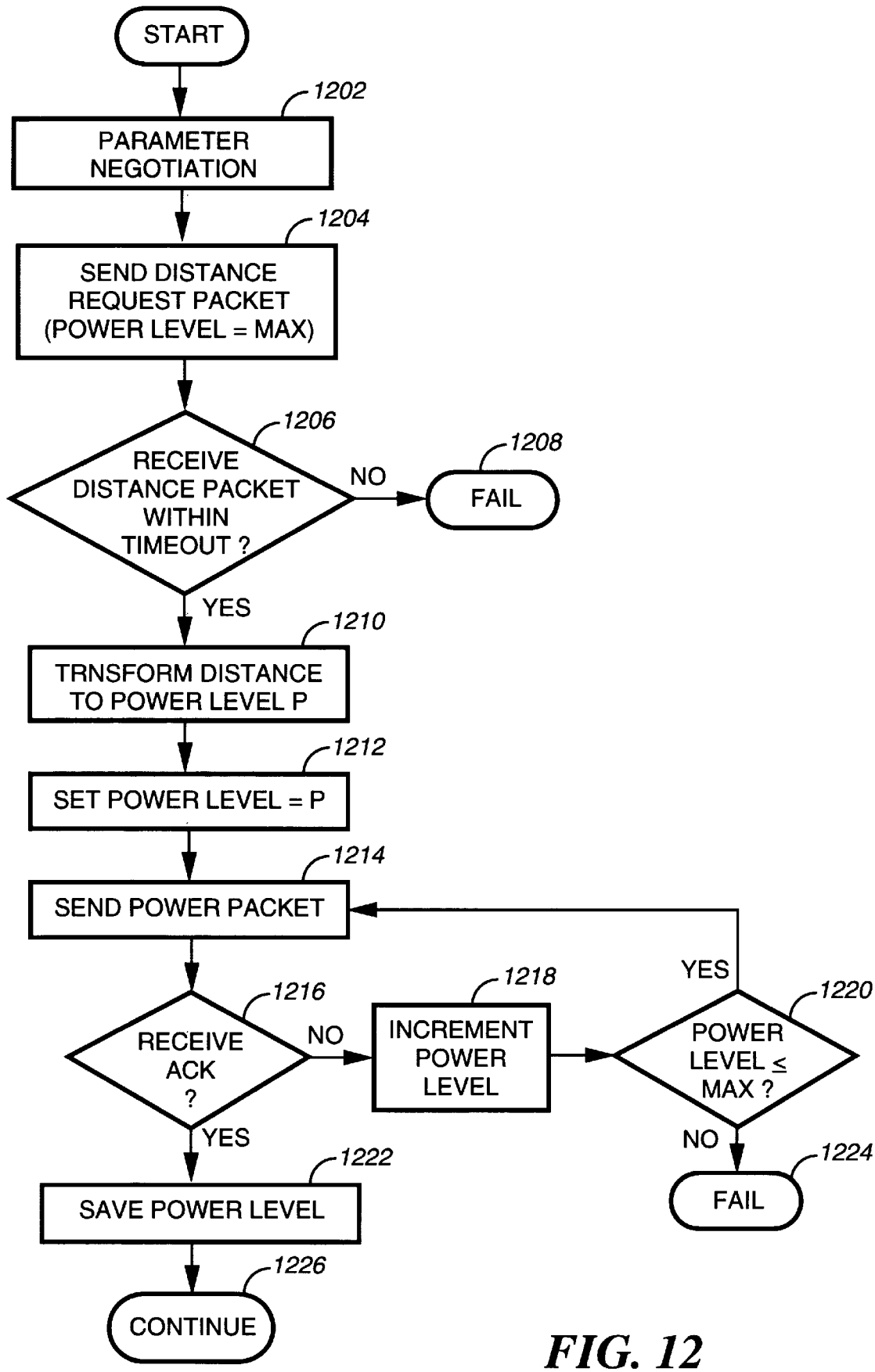
FIG. 12 is a flowchart highlighting the steps taken by a secondary device to adjust the IR power level in accordance with the embodiment of FIG. 11.

A further enhancement to the routines of FIGS. 9 and 10 are shown in FIGS. 11 and 12. Assuming that the IR transceiver 84 has fairly consistent transmit and receive characteristics, it is possible to empirically determine the distance between the primary and secondary devices based on the transmit power level used to establish the communication link(s). The primary and secondary devices would each have a table of average distances indexed by transmit power levels. Thus, once the primary device has determined its transmit power level using the routines described above, it would lookup the approximate distance in the table. This distance information would then be transmitted to the secondary device. The secondary device would use the distance information to extrapolate a starting transmit power level. This would help speed up the time it takes the secondary device to establish the correct power level to establish communications with the primary device. This distance information could also be used by both the primary and secondary devices for other purposes (i.e., additional information presented to the user).

Referring to FIG. 11, the primary device commences parameter negotiations in step 1102. In step 1104 it is determined if a distance request packet has been received by a particular secondary device within a time-out window. If the distance request message has been received in step 1104, the primary device transmits a distance packet which includes the extrapolated distance in step 1106 to the secondary device. In steps 1108–1114, like previously discussed with respect to FIG. 9, the primary determines if it has received a power packet within the time-out window in step 1108, it then transmits an acknowledgment signal to the secondary in step 1110 if it received the power packet. In step 1112, it is determined if other secondary devices are communicating with the primary, and if so, parameter negotiations are also commenced for those secondary devices.

The secondary device routine is shown in FIG. 12. In step 1202 the secondary device commences parameter negotiations with the primary device 50. In step 1204, the secondary transmits a distance request packet to the primary device using the maximum power level stored in its memory, in order to have the greatest chance of communicating with the primary device. In decision step 1206, it is determined if the secondary device has received the distance packet from the primary device within the time-out window. If the distance packet is not received within the predetermined time-out window, the communication link fails in step 1208.

If the distance packet is timely received, the secondary device using its stored distance table information transforms the received distance information into a particular power level (P) in step 1210. The secondary device in step 1212, sets the power level of its IR transceiver to "P" ("P" being one of the available power levels) and sends a power packet in step 1214 at that power level. Like the previously discussed algorithms, the secondary device in step 1216, then determines if it has received an acknowledgment packet from the primary device. If so, the power level used is stored in RAM in step 1222 in association with the primary device's identification information, and the devices continue with normal communications in step 1226.

If in step 1216 it is determined that no acknowledgment has been received within a certain period of time, the transmit IR power level is incremented in step 1218. In step 1220 it is determined if the power level is above a certain maximum level. If it is determined that the power level is below the predetermined maximum level the routine loops back to step 1214. If however, the power level is determined to be above the predetermined maximum power level, the routine fails in step 1224.

Packet-based Power Management

Packet based power management is accomplished in accordance with the invention by incorporating power-related information into the handshake protocol during transmission of data and idle frames between the primary 50 and secondary devices 420, 430. This allows the primary and secondary devices to dynamically adjust power throughout a session. This is advantageous when the devices are not stationary for the duration of a session. This routine is an enhancement to the routine discussed with reference to FIGS. 9 and 10. Those routines are used to establish the initial power levels for all primary and secondary devices. Then, as each device sends data/idle frames, they will contain additional signal strength information in the form of a bit error rate (BER) measurement or some other well known measurements (e.g., signal-to-noise ratio, etc.) which provide an indication as to the current conditions of the communication link. For every frame or sequence of frames transmitted by a device, the BER value from the most recently received data is included within the data area of the first frame or other frame transmitted.

Whenever a primary or secondary device transmits a frame with the P/F bit set (indicating the last frame in a sequence "S" has been transmitted and now is waiting for a response), the next frame received will contain BER data for the frame sequence "S". Looking at the flowchart shown in FIG., 13, the routine implements a feedback mechanism for power adjustments as follows:

IF ((frame was NAKed) OR (no ACK/NAK received) OR (BER>threshold))

THEN increment power level

ELSE decrement power level. A debounce trigger point is built-in as a further enhancement into this algorithm in order to filter out bursty errors and avoid unnecessary power adjustments. Idle frames received will also preferably contain BER data from the last transmission. The BER for a particular transmission sequence can be determined using one of a number of well known BER algorithms known in the art.

Figure 13:
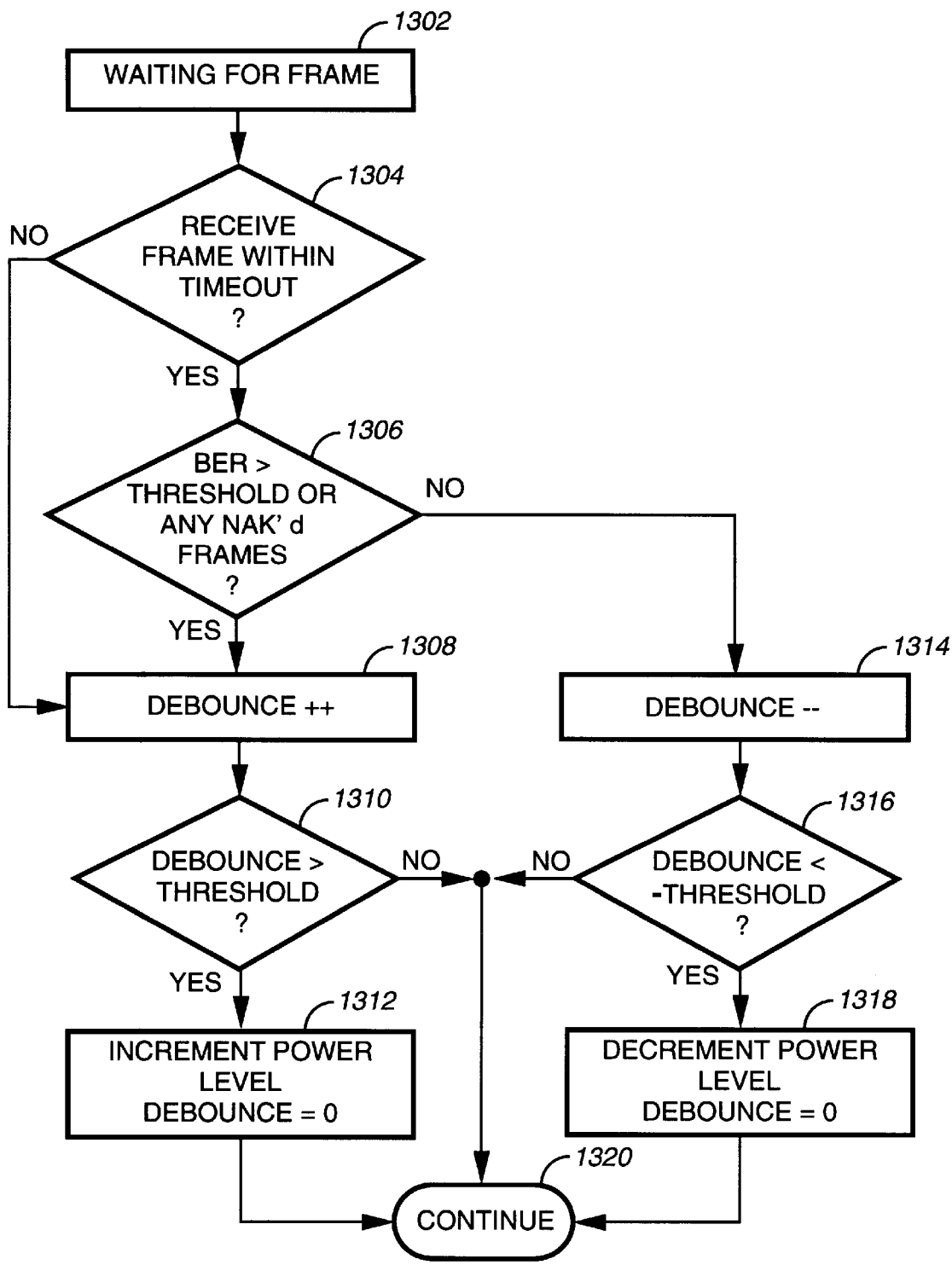
FIG. 13 is a flowchart highlighting the steps taken to adjust the IR power level in accordance with a further embodiment of the present invention.

Referring to FIG. 13, in step 1302, the device (either a primary or secondary) waits for an incoming frame. In step 1304 it is determined if the frame has been received within a predetermined time-out window. If the frame was received within the time-out window, in step 1306 it is determined if the BER is greater than a predetermined BER threshold, or if any NAK (no acknowledgment) packets have been received or no acknowledgment (ACK) packet have been received. If any of these are met, the routine moves on to step 1308. In step 1308, a first debounce counter (labeled as DEBOUNCE++ in FIG. 13) which is stored in the device is incremented a predetermined amount. Note that the debounce threshold is different than the BER threshold.

In step 1310, it is determined if the debounce value is greater than a first predefined debounce threshold level stored in the device. If it is, then in step 1312 the power level is incremented and the debounce value is set at zero (reset). In step 1320, the communication between the two devices continues with the device again waiting for a frame to receive or a frame to transmit.

If in step 1306 it is determined that the BER is less than the predefined threshold, a negative acknowledgment (NAK) has been received or no acknowledgment (ACK) has been received, in step 1314, a negative debounce counter (labeled DEBOUNCE—in FIG. 13) is decreased. In step 1316, it is then determined if the debounce value is less than a negative or second threshold level (labeled as "—THRESHOLD" in FIG. 13) also stored in the device. If the debounce value is lower than the threshold, in step 1318, the IR transmit power level is decremented and the debounce value is set reset. The routine then moves on to step 1320.

With the present invention one or more devices which are communicating with each other can optimize there IR transmission power levels in order to conserve power. The methods presented above are extremely beneficial especially for portable electronic devices which operate using batteries, since the IR transmit power levels are adjusted for the operating conditions at hand. The several embodiments discussed above provide different levels of sophistication depending upon the particular system requirements.

While the preferred embodiments of the invention have been illustrated and described, it will be clear that changes, variations, substitutions and equivalents will occur to those skilled in the art without departing from the spirit and scope of the present invention as defined by the appended claims.

What is claimed is:

1. A method for automatically adjusting the infrared (IR) power level of a first electronic device's infrared transmitter which is attempting to establish a communication link with a second electronic device, the first electronic device having a memory, comprising:
    (a) storing in the memory a time-out period;
    (b) attempting to establish the IR communication link with the second electronic device at a first power level;
    (c) waiting for the time-out period to elapse; and
    (d) attempting to establish the IR communication link with the second electronic device at a second power level which is greater than the first power level if the communication link was not established.

2. A method as defined in claim 1, wherein step (d) comprises the sub-steps of:
    (d1) sending a control signal to the infrared transmitter; and
    (d2) increasing the amount of current supplied to the infrared transmitter in response to the control signal in order to place the IR transmitter at the second power level.

3. A method as defined in claim 1, further comprising:
    (e) providing an indication at the first electronic device that the communication link was not established if step (d) fails to establish the IR communication link with the second electronic device.

4. A method as defined in claim 1, wherein the second electronic device transmits a signal back to the first electronic device if it receives a message from the first electronic device and the first electronic device upon receiving the signal from the second electronic device determines that the IR communication link between the first and second electronic devices has been established.

5. A method as defined in claim 4, wherein the first electronic device upon receiving the signal from the second electronic device performs the following further step:
    (e) storing at the first electronic device an identification number for the second electronic device along with information on the power level used by the first electronic device to establish the IR communication link with the second electronic device.

6. A method as defined in claim 5, wherein the first electronic device uses the power level it stored to communicate with the second electronic device after the IR communicate link has been established between the first and second electronic devices.

7. A method as defined in claim 1, wherein the second electronic device after the first electronic device has established a communication link with the second electronic device performs the following steps in order to determine the proper transmit power level for it to use when communicating with the first electronic device:
    (e) attempting to establish an IR communication link with the first electronic device at a first power level;
    (f) determining if the IR communication link between the first electronic device and the second electronic device was established; and
    (g) attempting to establish the IR communication link with the first electronic device at a second power level which is greater than the first power level if the communication link in step (f) was not established.

8. A method as defined in claim 7, wherein the first electronic device transmits a signal back to the second electronic device if it receives a message from the second electronic device and the second electronic device upon receiving the signal from the first electronic device determines that the IR communication link between the first and second electronic devices has been established.

9. A method as defined in claim 8, wherein the second electronic device upon receiving the signal from the first electronic device performs the following further step:
    (h) storing at the second electronic device an identification number for the first electronic device along with information on the power level used by the second electronic device to establish the IR communication link with the first electronic device.

10. A method as defined in claim 1, wherein the second electronic device after a communication link has been established with the first electronic device transmits a message to the first electronic device having a bit error rate (BER) information.

11. A method as defined in claim 10, wherein the first electronic device increases the power level which it uses to communicate with the second electronic device if the BER information received from the second electronic device indicates that the BER is above a predetermined threshold level.

12. A method as defined in claim 10, wherein the first electronic device decreases the power level which it uses to communicate with the second electronic device if the BER information received from the second electronic device indicates that the BER is below a predetermined threshold level.

13. A method as defined in claim 1, comprising the further steps of:
    (e) determining a distance value stored in the first electronic device corresponding to the power level used to establish the communication link with the second electronic device; and
    (f) transmitting the distance value to the second electronic device.

14. A method as defined in claim 13, comprising the further steps of:
    at the second electronic device:
        (g) receiving the distance value transmitted by the first electronic device;

(h) determining a power level stored in the second electronic device associated with the received distance value; and (i) using the power level determined in step (h) to communicate with the first electronic device.

15. A method for automatically adjusting the infrared (IR) power level of an electronic device's infrared transmitter for an electronic device which is attempting to establish a communication link with a plurality of secondary devices, comprising:

(a) attempting to establish IR communication links with the plurality of secondary devices at a first IR power level;

(b) determining if the IR communication link between the electronic device and the plurality of secondary devices was established;

(c) storing for each amongst the plurality of secondary devices which was able to establish a communication link with the electronic device, device identification information and the first power level information at the electronic device; and (d) increasing the IR power level to a second IR power level which is greater than the first IR power level if in step (b) it is determined that not all of the plurality of secondary devices were able to establish an IR communication link with the electronic device at the first power level.

16. A method as defined in claim 15, further comprising:

(e) attempting to establish a communication link using the second IR power level with those amongst the plurality of secondary devices which did not establish a communication link with the electronic device at the first IR power level;

(f) determining if IR communication links between the electronic device and with those amongst the plurality of secondary devices which did not establish an IR communication link with the electronic device at the first IR power level were established; and (g) storing for each amongst the plurality of secondary devices which was able to establish an IR communication link with the electronic device in step (f), device identification information and the second power level information at the electronic device.

17. A method as defined in claim 15, wherein the electronic device before attempting to communicate with any of the plurality of secondary devices determines the particular identification number for the secondary device from amongst the plurality of secondary device which it wants to communicate with and determines if it has stored in a power level table a power level which is associated with that particular identification number.

18. A method for automatically adjusting the infrared (IR) power level of a first electronic device's infrared transmitter which is attempting to establish a communication link with a second electronic device, comprising:

(a) attempting to establish the IR communication link with the second electronic device at a first power level;

(b) determining if the IR communication link between the first electronic device and second electronic device was established;

(c) attempting to establish the IR communication link with the second electronic device at a second power level which is greater than the first power level if the communication link in step (b) was not established;

(d) determining a distance value stored in the first electronic device corresponding to the power level used to establish the communication link with the second electronic device; and (e) transmitting the distance value to the second electronic device.

19. A method as defined in claim 18, comprising the further steps of:

at the second electronic device:

(f) receiving the distance value transmitted by the first electronic device;

(g) determining a power level stored in the second electronic device associated with the received distance value; and (h) using the power level determined in step (g) to communicate with the first electronic device.

20. A method as defined in claim 18, wherein step (d) comprises the sub-steps of:

(d1) sending a control signal to the infrared transmitter; and (d2) increasing the amount of current supplied to the infrared transmitter in response to the control signal in order to place the IR transmitter at the second power level.

21. A method as defined in claim 18, further comprising:

(f) providing an indication at the first electronic device that the communication link was not established if step (d) fails to establish the IR communication link with the second electronic device.

22. A method as defined in claim 18, wherein the second electronic device transmits a signal back to the first electronic device if it receives a message from the first electronic device and the first electronic device upon receiving the signal from the second electronic device determines that the IR communication link between the first and second electronic devices has been established.

23. A method as defined in claim 22, wherein the first electronic device upon receiving the signal from the second electronic device performs the following further step:

(f) storing at the first electronic device an identification number for the second electronic device along with information on the power level used by the first electronic device to establish the IR communication link with the second electronic device.

24. A method as defined in claim 23, wherein the first electronic device uses the power level it stored to communicate with the second electronic device after the IR communicate link has been established between the first and second electronic devices.

25. A method as defined in claim 18, wherein the second electronic device after the first electronic device has established a communication link with the second electronic device performs the following steps in order to determine the proper transmit power level for it to use when communicating with the first electronic device:

(f) attempting to establish an IR communication link with the first electronic device at a first power level;

(g) determining if the IR communication link between the first electronic device and the second electronic device was established; and (h) attempting to establish the IR communication link with the first electronic device at a second power level which is greater than the first power level if the communication link in step (e) was not established.

26. A method as defined in claim 25, wherein the first electronic device transmits a signal back to the second electronic device if it receives a message from the second electronic device and the second electronic device upon receiving the signal from the first electronic device determines that the IR communication link between the first and second electronic devices has been established.

27. A method as defined in claim 26, wherein the second electronic device upon receiving the signal from the first electronic device performs the following further step:

(i) storing at the second electronic device an identification number for the first electronic device along with information on the power level used by the second electronic device to establish the IR communication link with the first electronic device.

28. A method as defined in claim 18, wherein the second electronic device after a communication link has been established with the first electronic device transmits a message to the first electronic device having a bit error rate (BER) information.

29. A method as defined in claim 28, wherein the first electronic device increases the power level which it uses to communicate with the second electronic device if the BER information received from the second electronic device indicates that the BER is above a predetermined threshold level.

30. A method as defined in claim 28, wherein the first electronic device decreases the power level which it uses to communicate with the second electronic device if the BER information received from the second electronic device indicates that the BER is below a predetermined threshold level.

* * * * *